(12) United States Patent
Miyajima (10) Patent No.: US 11,131,868 B2
(45) Date of Patent: Sep. 28, 2021

(54) METHOD FOR CORRECTIVE LENS AND CORRECTIVE LENS

(71) Applicant: Itoh Optical Industrial Co., Ltd., Gamagori (JP)

(72) Inventor: Yasushi Miyajima, Gamagori (JP)

(73) Assignee: Itoh Optical Industrial Co., Ltd., Gamagori (JP)

( * ) Notice: Subject to any disclaimer, the term of this patent is extended or adjusted under 35 U.S.C. 154(b) by 216 days.

(21) Appl. No.: 16/305,200

(22) PCT Filed: Nov. 25, 2016

(86) PCT No.: PCT/JP2016/084962
§ 371 (c)(1),
(2) Date: Nov. 28, 2018

(87) PCT Pub. No.: WO2018/096647
PCT Pub. Date: May 31, 2018

(65) Prior Publication Data
US 2020/0319478 A1    Oct. 8, 2020

(51) Int. Cl.
*G02C 7/04*    (2006.01)
*G02C 7/02*    (2006.01)
*G02C 7/06*    (2006.01)

(52) U.S. Cl.
CPC ............ *G02C 7/041* (2013.01); *G02C 7/024* (2013.01); *G02C 7/06* (2013.01)

(58) Field of Classification Search
CPC .......... G02C 7/04; G02C 7/041; G02C 7/024; G02C 7/06; G02C 7/061; G02C 7/63; G02C 7/068; G02B 27/0075

(Continued)

(56) References Cited

U.S. PATENT DOCUMENTS 4,181,409 A    1/1980    Whitney et al.
5,767,939 A *  6/1998    Komatsu .................. G02C 7/02
                                                351/159.02

(Continued)

FOREIGN PATENT DOCUMENTS

CN    1412604 A    4/2003
CN    1710463 A    12/2005

(Continued)

OTHER PUBLICATIONS

Ito Optical Industrial Co., Ltd. Kogaku Sekkei. Seizobu Kaihatsu G, "Hishakai Shindo Encho Sekkei ni yoru Megane Lens, ES Series, Extended Depth of Field (EDF) Sekkei," Kabushiki Kaisha TSL [online], Jul. 29, 2016,[retrieved on Feb. 6, 2017], pp. 1 to 20.

(Continued)

*Primary Examiner* — Travis S Fissel
(74) *Attorney, Agent, or Firm* — Locke Lord LLP (57) ABSTRACT

A corrective lens that can improve contrast sensitivity in a dark place, for example, at night is provided. When an axis in the anteroposterior direction passing through the geometric center of a lens is defined as the z-axis and a direction extending to the rear side of the lens is defined as the positive direction of the z-axis, a focal depth extension component represented by $Ar^3$ (where r is the distance from the z-axis and A is a constant) is added to the z-coordinate value of a refractive surface determined based on a prescription power to increase the focal depth. The focal depth that decreases (shallows) in a dark place is increased to facilitate focusing on a target object located in front of or behind the original focal point. This can improve contrast sensitivity in a dark place.

8 Claims, 8 Drawing Sheets (58) Field of Classification Search
USPC ..... 351/159.05, 159.73, 159.74, 159.52, 178
See application file for complete search history.

(56) References Cited

U.S. PATENT DOCUMENTS

| | | | |
|---|---|---|---|
| 2011/0051082 A1* | 3/2011 | Becken | G02C 7/024 351/159.76 |
| 2014/0211313 A1 | 7/2014 | Dobschal | |
| 2014/0257480 A1* | 9/2014 | Van Der Mooren | G02C 7/028 623/6.37 |

FOREIGN PATENT DOCUMENTS

| | | |
|---|---|---|
| CN | 1779506 A | 5/2006 |
| CN | 103858046 A | 6/2014 |
| EP | 0560999 A1 | 9/1993 |
| JP | 64-50012 A | 2/1989 |
| JP | 2005-242346 A | 9/2005 |
| JP | 4335957 B1 | 9/2009 |
| JP | 2009-282391 A | 12/2009 |
| JP | 2016-206338 A | 12/2016 |
| WO | 2009/140080 A3 | 11/2009 |

OTHER PUBLICATIONS

International Search Report dated Feb. 21, 2017, issued for PCT/JP2016/084962.
Ito Optical Industrial Co., Ltd. Kogaku Sekkei. Seizobu Kaihatsu G, "Hishakai Shindo Encho Sekkei ni yoru Megane Lens, ES Series, Extended Depth of Field (EDF) Sekkei," Kabushiki Kaisha TSL [online], Jul. 29, 2016,[retrieved on Feb. 6, 2017], pp. 1 to 20 and English translation thereof.
English translation of the Written Opinion dated Feb. 21, 2017, issued for PCT/JP2016/084962.
Search Report dated Feb. 14, 2020, issued for the Chinese patent application No. 2016800863357.
Supplementary European Search Report dated Dec. 19, 2019, issued for the European patent application No. 16922435.9.
Office Action dated Jul. 31, 2019, issued for the Chinese patent application No. 201680086335.7 and English translation thereof.

* cited by examiner

ASPHERICAL COMPONENT    POWER COMPONENT

METHOD FOR CORRECTIVE LENS AND CORRECTIVE LENS

TECHNICAL FIELD

The present invention relates to a corrective lens such as an eyeglass lens or contact lens and a design method for the corrective lens and, more particularly, to a corrective lens having a focal depth extension effect and a design method for the corrective lens.

BACKGROUND ART

Patent Literature 1 cited below discloses an optical plate that can increase the optical depth, which is the optical plate of the second optical system disposed in front of the first optical system serving as an imaging optical system for incident light waves. It is described that this optical plate increases in thickness almost in proportion to a third-order power function of the distance from a base point in the optical plate.

CITATION LIST

Patent Literature

Patent Literature 1: JP No. 2009-282391 A (see Claims 1 and 2)

SUMMARY OF INVENTION

Technical Problem

Meanwhile, in a dark place with low illuminance, for example, in the evening or at night, a person whose accommodation ability of the eye has deteriorated due to aging or fatigue experiences difficulty in perceiving contrast, and experiences difficulty in seeing even with eyeglasses or contact lenses.

The present invention solves the above problem and has its object to provide a design method for a corrective lens that can improve contrast sensitivity in a dark place and a corrective lens.

Solution to Problem

A design method for a corrective lens according to the present invention is characterized in that when an axis in an anteroposterior direction passing through the geometric center of a lens is defined as the z-axis and a direction extending to the rear side of the lens is defined as the positive direction of the z-axis, a focal depth extension component represented by $Ar^3$ (where r is the distance from the z-axis and A is a constant) is added to the z-coordinate value of a refractive surface determined based on a prescription power to increase the focal depth. A corrective lens prepared by this preparation method increases in focal depth, which decreases (shallows) in a dark place, to facilitate focusing on a target object located in front of or behind the original focal point. This makes it possible to improve the contrast sensitivity in a dark place.

In this case, when the refractive surface is the rear surface of the lens and the constant A is a positive number or the refractive surface is the front surface of the lens and the constant A is a negative number, an edge thickness reduction component for a reduction in edge thickness of the lens is preferably added to the z-coordinate value. This is because adding the edge thickness reduction component will reduce the edge thickness that is increased by the addition of a focal depth extension component.

The edge thickness reduction component is preferably represented by $Dr^{10}$ (where D is a negative constant when constant A is positive, and is a positive constant when constant A is negative). This is because such setting increases the influence on the edge portion of the lens and can reduce the edge thickness.

The constant A is preferably set such that the absolute value of the constant A falls within a range of $1.73 \times 10^{-6}$ to $1.96 \times 10^{-5}$. This is because when the absolute value of constant A for an eyeglass lens having a normal size falls within such a range, an appropriate focal depth extension effect can be obtained, and the occurrence of astigmatism can be suppressed.

The constant A and the constant D are preferably set such that the absolute value of the constant A falls within a range of $1.73 \times 10^{-6}$ to $1.96 \times 10^{-5}$, the absolute value of the constant D falls within a range of $1.65 \times 10^{-17}$ to $1.88 \times 10^{-16}$, and the absolute value of the constant D increases with an increase in the absolute value of the constant A. This is because setting constant A and constant D for an eyeglass lens having a normal size in this manner can provide an appropriate focal depth extension effect and suppress the occurrence of astigmatism. In addition, this can make the edge thickness equal to that of the lens before the addition of a focal depth extension component.

A corrective lens according to the present invention is characterized in that when an axis in an anteroposterior direction passing through the geometric center of a lens is defined as the z-axis and a direction extending to the rear side of the lens is defined as the positive direction of the z-axis, a focal depth extension component represented by $Ar^3$ (where r is the distance from the z-axis and A is a constant) is added to the z-coordinate value of a refractive surface determined based on a prescription power to increase the focal depth. This lens increases in focal depth, which decreases (shallows) in a dark place, to facilitate focusing on a target object located in front of or behind the original focal point. This makes it possible to improve the contrast sensitivity in a dark place.

In this case, when the refractive surface is the rear surface of the lens and the constant A is a positive number or the refractive surface is the front surface of the lens and the constant A is a negative number, an edge thickness reduction component for a reduction in edge thickness of the lens is preferably added to the z-coordinate value. This is because adding the edge thickness reduction component will reduce the edge thickness that is increased by the addition of a focal depth extension component.

The edge thickness reduction component is preferably represented by $Dr^{10}$ (where D is a negative constant when constant A is positive, and is a positive constant when constant A is negative). This is because such setting increases the influence on the edge portion of the lens and can reduce the edge thickness.

The absolute value of the constant A preferably falls within a range of $1.73 \times 10^{-6}$ to $1.96 \times 10^{-6}$. This is because when the absolute value of constant A for an eyeglass lens having a normal size falls within such a range, an appropriate focal depth extension effect can be obtained, and the occurrence of astigmatism can be suppressed.

DESCRIPTION OF EMBODIMENTS

The embodiments of the present invention will be described below with reference to the accompanying drawings. Note that, in the following description, the back and forth, right and left, and up and down of a person wearing eyeglasses using lenses respectively coincide with the back and forth, right and left, and up and down of each lens.

First Embodiment

Figure 1:
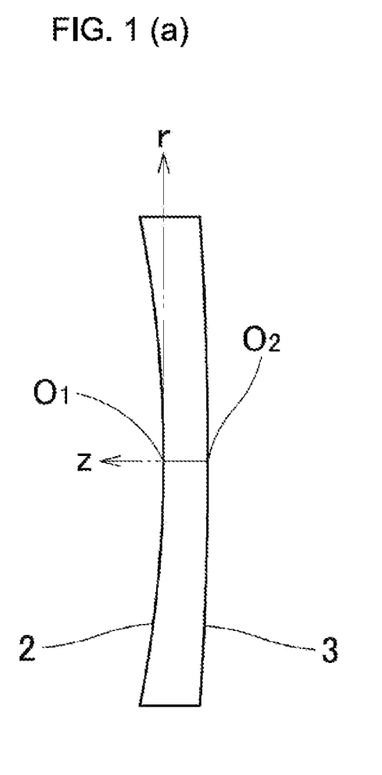
FIG. 1(a) and FIG. 1(b) show a schematic view FIG. 1(a) of an overall lens according to the first embodiment and an enlarged schematic view FIG. 1(b) of an upper half of the same lens.

As shown in FIG. 1(a) and FIG. 1(b), a lens 1 according to the first embodiment is a corrective lens for correcting the vision of the wearer, and more specifically an eyeglass lens used for eyeglasses. The lens 1 has, as a rear surface 2, a concave surface defined by equation (i), and, as a front surface 3, a convex surface defined by equation (ii). Note that an axis in an anteroposterior direction passing through the geometric center of the lens 1 (a base point $O_1$ on the rear surface 2 or a base point $O_2$ on the front surface 3) is defined as the z-axis and a direction extending to the rear side of the lens 1 is defined as the positive direction of the z-axis. The z-axis coincides with the optical axis of the lens 1.

$$z = r^2/(R_1 + (R_1^2 - Kr^2)^{1/2}) + Ar^3 \quad \text{(i)}$$

$$z = r^2/(R_2 + (R_2^2 - Kr^2)^{1/2}) \quad \text{(ii)}$$

In equations (i) and (ii), r is the distance from the z-axis. Specifically, consider an orthogonal coordinate system having the base point $O_1$ on the rear surface 2 or the base point $O_2$ on the front surface 3 as the center and axes orthogonal to the z-axis in the up/down direction and the right/left direction as the x-axis and the y-axis, respectively. In this case, $r = (x^2 + y^2)^{1/2}$. $R_1$ and $R_2$ are curvature radii at the vertices of the surfaces, K is 1, and A is a positive constant. Accordingly, the front surface 3 and the rear surface 2 of the lens 1 are respectively a spherical surface and an aspherical surface. Note that $R_1$ and $R_2$ are determined by a prescription power (more specifically, S power, C power, and astigmatic axis AX). The lens 1 is a distance lens for a myopic person, and hence $R_1 < R_2$.

As indicated by equation (i), for the rear surface 2, a third-order term $Ar^3$ of r is added to the z-coordinate value of a refractive surface defined by equation (iii) given below based on a prescription power.

$$z = r^2/(R_1 + (R_1^2 - Kr^2)^{1/2}) \quad \text{(iii)}$$

Figure 2:
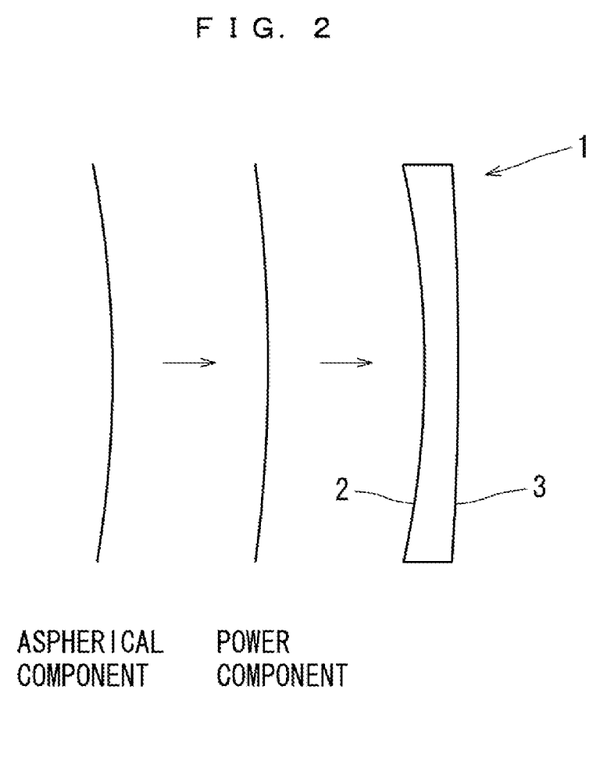
FIG. 2 is a view for explaining the lens according to the first embodiment.

The term $Ar^3$ is a focal depth extension component added for focal depth extension. As disclosed in Patent Literature 1, the focal depth can be increased by causing light to pass through an optical plate whose thickness is changed in proportion to a third-order power function of the distance r from the base point. The lens 1 is an application of this technique. The rear surface 2 of this lens is formed by adding a portion (focal depth extension component) whose thickness changes in proportion to a third-order power function of the distance r from the z-axis (that is, the distance from the base point $O_1$ as an intersection point between the z-axis and the rear surface 2 shown in FIG. 1(a)) to the refractive surface determined based on a prescription power (in this embodiment, a spherical surface with the curvature radius $R_1$, which will also be referred to as the original spherical surface hereinafter and is denoted by reference symbol S in FIG. 1(b)). As indicated by equations (i) and (iii) given above, the rear surface 2 can be said to be a combination of the spherical surface with the curvature radius $R_1$ and the aspherical surface represented by $Ar^3$. In other words, as schematically shown in FIG. 2, the rear surface 2 is formed by combining a power component for implementing a prescription power and a focal depth extension component (aspherical component) for focal depth extension.

Constant A is selected from a range of $1.73 \times 10^{-6}$ to $1.96 \times 10^{-5}$ for the following reason. When constant A for an eyeglass lens having a normal size (diameter: 50 mm to 80 mm) falls within this range, an appropriate focal depth extension effect can be obtained, and the occurrence of astigmatism can be suppressed. That is, with an increase in constant A, the focal depth extension effect increases, and the occurrence of astigmatism increases. The above range is determined in consideration of the balance between them.

In this embodiment, $A = 7.68 \times 10^{-6}$ is provided. As indicated by FIG. 1(b), this value is set such that when $\Delta$ represents a height in the z-axis direction at a radius "a" with reference to an original spherical surface S (that is, an increase in thickness relative to the original spherical surface S), $\Delta$ becomes 120 μm when "a" is 25 mm. Note that $A = \Delta/1000/a^3$ holds (where unit of "a": mm, unit of $\Delta$: μm). Incidentally, when "a" is 25 mm and A is 27 μm, $A = 1.73 \times 10^{-6}$, whereas when "a" is 15 mm and $\Delta$ is 66 μm, $A = 1.96 \times 10^{-5}$.

A design method for the lens 1 will be described next.

First, the refractive surface of the front surface 3 and the refractive surface of the rear surface 2 of the lens 1 are determined based on a prescription power. This determination method is well known, and hence a detailed description of the method will be omitted. A focal depth extension component represented by $Ar^3$ (where r is the distance from the z-axis and A is a constant) is then added to the z-coordinate value of the determined refractive surface of the front surface 3 or the rear surface 2.

In this embodiment, the refractive surface of the front surface 3 and the refractive surface of the rear surface 2 of the lens 1 were respectively determined, based on a prescription power, as spherical surfaces represented by equations (ii) and (iii) given above, and the focal depth extension component $Ar^3$ (where $A=7.68\times10^{-6}$) was added to the z-coordinate value of the refractive surface of the rear surface 2.

A focal depth extension effect will be described next.

Figure 3:
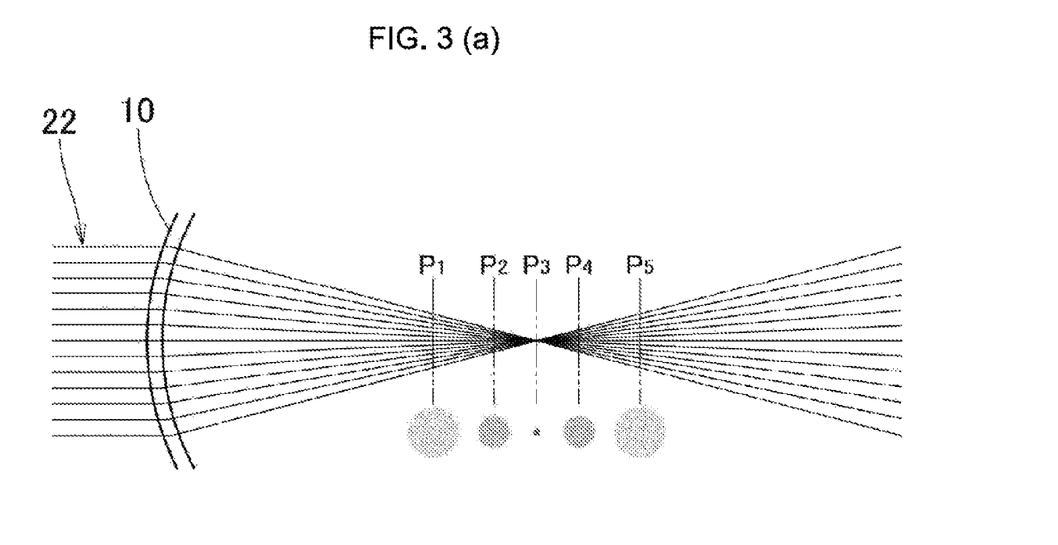
FIG. 3(a) and FIG. 3(b) show a schematic view FIG. 3(a) of a focused state of light beams by an ordinary single-focus lens and a schematic view FIG. 3(b) of a focused state of light beams by a lens according to the first embodiment.

In FIG. 3 (a) is schematic view of a focused state of light beams 22 by an ordinary lens 10 whose refractive surfaces of the front and rear surfaces are determined based on a prescription power. The light beams 22 incident on the lens 10 and parallel to the optical axis are focused to a focal position $P_3$ in a convergent manner, and hence the signal intensity is high at the focal position $P_3$ to provide a clear view of a target object. However, for example, at a position $P_4$ slightly shifted from the focus, the object rapidly blurs and fades. That is, the focal depth (in other words, the depth of field) is shallow. Note that the set of points shown in the lower part of FIG. 3(a) schematically shows how the light beams 22 converge at each of the positions $P_1$, $P_2$, $P_3$, $P_4$, and $P_5$.

In FIG. 3 (b) is a schematic view of a focused state of light beams 22 by the lens 1. The light beams 22 incident on the lens 1 and parallel to the optical axis converge while diverging within a certain range including the focal position $P_3$, resulting in a deep focal depth. Accordingly, although the target object still slightly blurs at the focal position $P_3$, the target object can be identified even at a position slightly shifted from the focus like the position $P_4$ because the signal intensity at a central part is high to a certain degree. Note that when constant A is a positive number, the focal depth is increased to the rear side (depth side) of the original focal position $P_3$.

The focal depth extension effect is high in a dark place with low illuminance, for example, at night. This phenomenon will be described below with reference to FIG. 4(a), FIG. 4(b) and FIG. 4(c). FIG. 4(a), FIG. 4(b) and FIG. 4(c) show the states of an eyeball 20 including an iris 21. Note that reference symbols $F_1$, $F_2$, and $F_3$ in FIG. 4(a), FIG. 4(b) and FIG. 4(c) denote focal depths (lengths).

Figure 4:
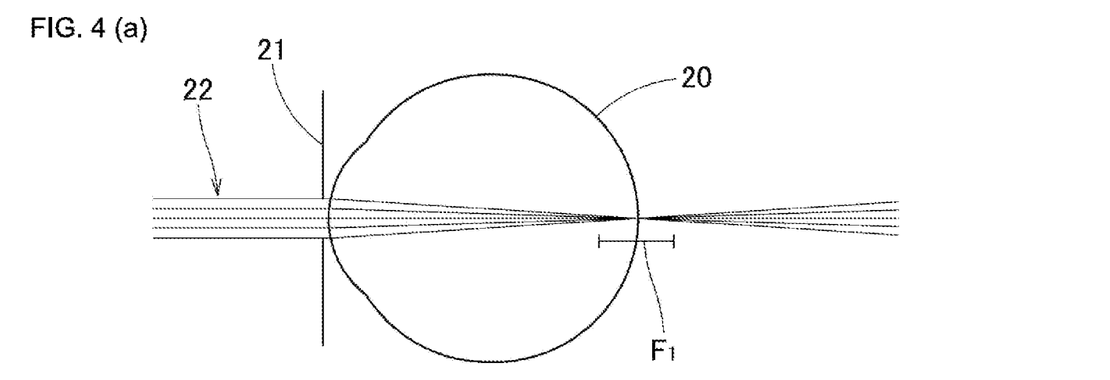
FIG. 4(a), FIG. 4(b) and FIG. 4(c) show a view FIG. 4(a) for explaining the focal depth of an ordinary single-focus lens in a bright place, a view FIG. 4(b) for explaining the focal depth of the ordinary single-focus lens in a dark place, and a view FIG. 4(c) for explaining the focal depth of a lens according to the first embodiment in a dark place.

In FIG. 4 (a) shows the state of the eyeball 20 in a bright place with high illuminance, for example, in the daytime. In this state, the iris 21 closes to narrow the incident light beams 22. As a consequence, the range in which light is focused extends, and hence the focal depth $F_1$ deepens (increases). Accordingly, focusing is achieved over a relatively long distance.

In FIG. 4 (b) shows the state of the eyeball 20 in a dark place, in which the iris 21 opens to thicken the incident light beams 22. As a consequence, the range in which light is focused shortens, and hence the focal depth $F_2$ shallows (decreases). Accordingly, the distance over which focusing is achieved shortens.

In FIG. 4 (c) shows the state of the eyeball 20 when the lens 1 is used in a dark place. In this state, the iris 21 opens to thicken the incident light beams 22. However, because the focal depth $F_3$ is large, focusing is achieved over a relatively long distance. Accordingly, the lens 1 facilitates identifying a target object in a dark place, in particular.

FIGS. 5 to 8 show the experimental results obtained by shooting indices in a case in which an ordinary single-focus lens (without power) to which no focal depth extension component is added is attached to the front side of the lens of a camera and in a case in which a focal depth extension lens obtained by adding a focal depth extension component in the manner described above to a single-focus lens with the same design as that of the ordinary single-focus lens is attached to the front side of the lens of the camera and comparing the resultant depths of field with each other. Tables 1 and 2 show the detailed data of the lenses used in this experiment. Note that the sag value (z-coordinate value) in Table 1 is a value at distance r=35 mm (that is, the edge of the lens) from the center. A plurality of indices were arranged at equal intervals (the intervals in the anteroposterior direction were 15 cm in FIGS. 5 and 6, and 10 cm in FIGS. 7 and 8) obliquely with respect to the camera.

TABLE 1

| | |
|---|---|
| Z: Sag Value | 4.565 mm |
| X: Distance from Center | 35.00 mm |
| R: Curvature Radius | 146.738 mm |
| K: Aspherical Coefficient | 1 |
| A: Constant (mm) | 7.68E−06 |
| Δ: Height at Effective Radius (μm) | 120 |
| a: Effective Radius (mm) | 25 |

TABLE 2

| | |
|---|---|
| INDEX | 1.60 |
| S | −0.00 D |
| C | −0.00 D |
| AX | 0 |
| CT (Center Thickness) | 1.80 mm |
| Δ (Prism) | 0.00 |
| Lens Diameter | 70.00 mm |
| Convex Surface R ($R_2$) | 147.57 mm |
| Concave Surface R ($R_1$) | 146.738 mm |

Figure 5:
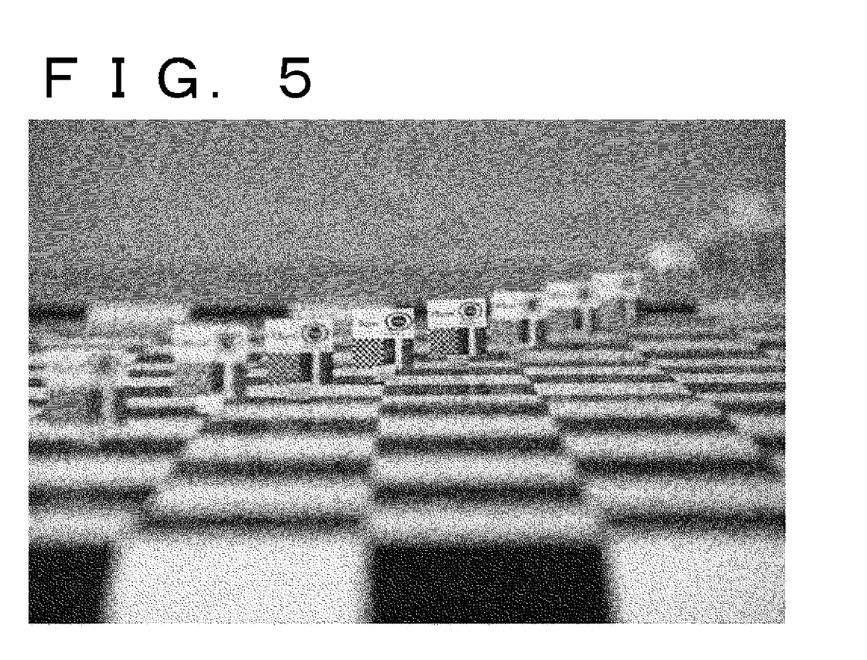
FIG. 5 is a view showing a photograph obtained by shooting indices in a bright place by using an ordinary single-focus lens.
Figure 6:
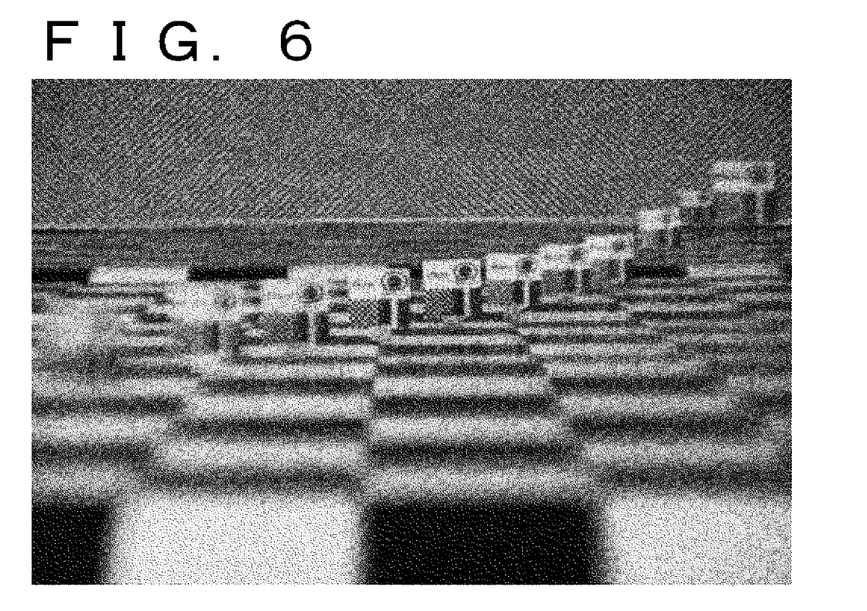
FIG. 6 is a view showing a photograph obtained by shooting indices in a bright place by using a lens according to the first embodiment.

FIGS. 5 and 6 respectively show the photographs obtained by shooting with the single-focus lens and the focal depth extension lens in a bright place, with focal length: 135 mm, F-number: 4.5, shutter speed: 1/25, ISO: 400, distance from camera to nearest index: about 200 cm, illuminance near camera: 80 lx, and illuminance close to the nearest index: 90 lx.

Figure 7:
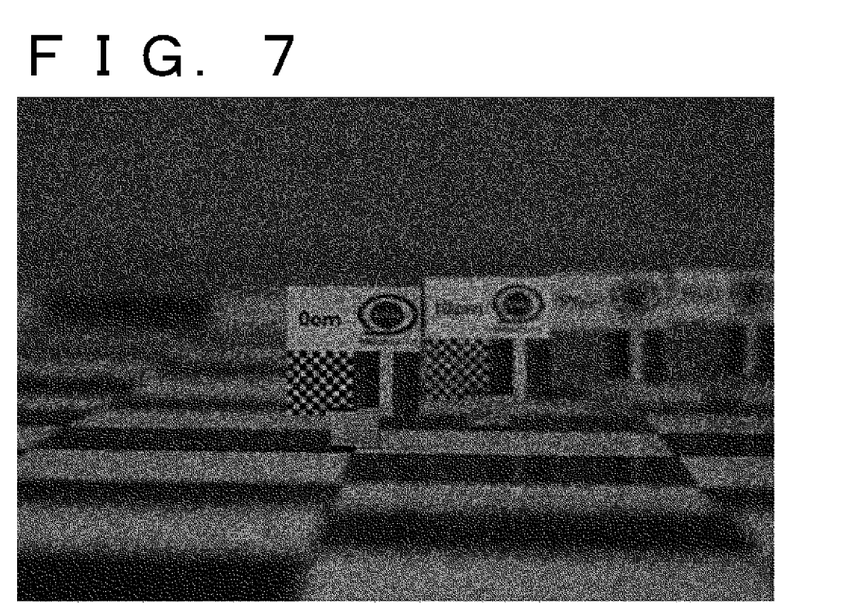
FIG. 7 is a view showing a photograph obtained by shooting indices in a dark place by using the ordinary single-focus lens.
Figure 8:
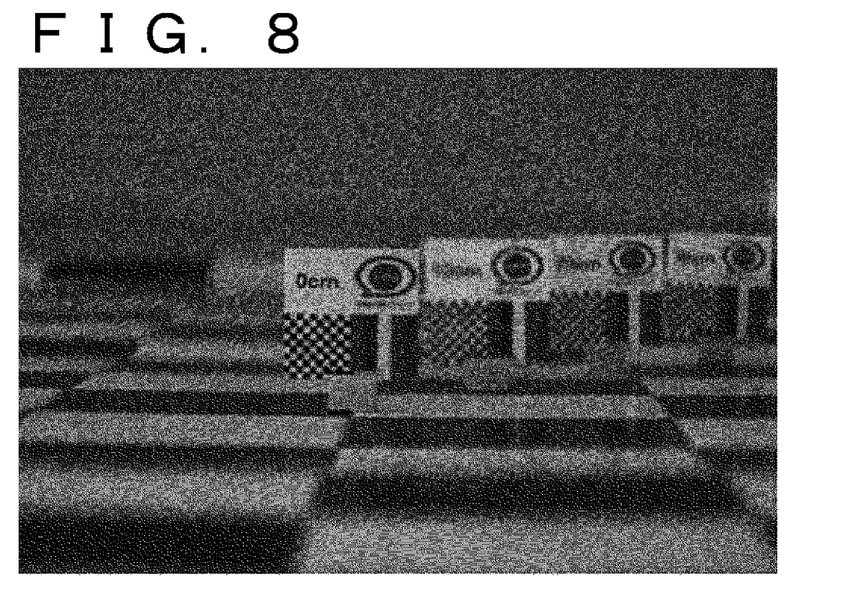
FIG. 8 is a view showing a photograph obtained by shooting indices in a dark place by using the lens according to the first embodiment.

FIGS. 7 and 8 respectively show the photographs obtained by shooting with the single-focus lens and the focal depth extension lens in a dark place, with focal length: 135 mm, F-number: 8.0, shutter speed: 1/10, ISO: 400, distance from camera to nearest index: about 100 cm, illuminance near camera: 48 lx, and illuminance close to the nearest index: 55 lx.

Comparisons between FIGS. 5 and 6 and between FIGS. 7 and 8 reveal that FIGS. 6 and 8 with the use of the focal depth extension lens provide visibility of indices at deeper positions and achieve larger depths of field than FIGS. 5 and 7 with the use of the ordinary single-focus lens, and that the difference in depth of field between the two lenses is greater in the dark place than in the bright place.

Next, description will be given of the results obtained by preparing, for seven subjects, ordinary single-focus lenses, each having a front surface determined by equation (ii) given above and a rear surface determined by equation (iii) given above in accordance with a corresponding prescription power, and focal depth extension lenses, each having the focal depth extension component $Ar^3$ (where $A=7.68\times10^{-6}$) added to a corresponding rear surface, i.e., the lenses 1, and measuring contrast sensitivities upon letting the subjects wear the prepared lenses. Table 3 shows the ages of the respective subjects, the prescription powers, and the powers of the prepared lenses. Note that the prepared lenses are prototypes, and hence there are slight differences between the powers of the lenses and the prescription powers. R and L in Table 3 respectively represent a right eye and a left eye, and each lens has a refractive index of 1.60. The contrast sensitivities were measured by using vision contrast tester 6500 available from Vitech Corporation.

TABLE 3

| Age | Prescription Lens Power | Single-Focus Lens Power | Focal Depth Extension Lens |
|---|---|---|---|
| 54 Years Old Subject A | R: S-0.00 C-0.00 AX0<br>L: S-0.00 C-0.00 AX0 | R: S-0.01 C-0.01 AX0<br>L: S-0.03 C-0.01 AX0 | R: S-0.07 C-0.03 AX0<br>L: S-0.08 C-0.02 AX0 |
| 53 Years Old Subject B | R: S-6.50 C-0.00 AX0<br>L: S-6.50 C-0.00 AX0 | R: S-6.59 C-0.00 AX0<br>L: S-6.59 C-0.00 AX | R: S-6.54 C-0.01 AX1<br>L: S-6.53 C-0.01 AX0 |
| 50 Years Old Subject C | R: S-2.25 C-0.00 AX0<br>L: S-1.25 C-0.50 AX175 | R: S-2.32 C-0.01 AX0<br>L: S-1.26 C-0.52 AX175 | R: S-2.34 C-0.02 AX0<br>L: S-1.34 C-0.47 AX175 |
| 42 Years Old Subject D | R: S-1.75 C-1.00 AX170<br>L: S-1.75 C-0.00 AX0 | R: S-1.76 C-1.07 AX170<br>L: S-1.77 C-0.00 AX0 | R: S-1.83 C-1.01 AX169<br>L: S-1.82 C-0.02 AX0 |
| 39 Years Old Subject E | R: S-4.50 C-0.75 AX165<br>L: S-4.25 C-0.75 AX175 | R: S-4.58 C-0.73 AX165<br>L: S-4.30 C-0.73 AX174 | R: S-4.58 C-0.75 AX163<br>L: S-4.35 C-0.72 AX177 |
| 34 Years Old Subject F | R: S-0.00 C-0.00 AX0<br>L: S-0.00 C-0.00 AX0 | R: S-0.02 C-0.00 AX0<br>L: S-0.00 C-0.01 AX0 | R: S-0.08 C-0.02 AX0<br>L: S-0.08 C-0.03 AX0 |
| 26 Years Old Subject G | R: S-2.25 C-0.50 AX180<br>L: S-2.50 C-0.00 AX0 | R: S-2.26 C-0.54 AX1<br>L: S-2.53 C-0.00 AX0 | R: S-2.34 C-0.47 AX179<br>L: S-2.59 C-0.03 AX0 |

Table 4 shows the measurement results. Vison contrast tester 6500 available from Vitech Corporation is designed to measure a contrast sensitivity depending on up to which index of a plurality of indices, arranged for each of indices A to E, it can identify. Table 4 shows up to which index each subject was able to identify for each of indices A to E. Note that in Table 4, lens A indicates an ordinary single-focus lens, and lens B indicates the lens 1. In addition, for each subject, measurements were conducted on the right eye, the left eye, and both eyes in bright and dark places. Table 4 includes illuminances in the respective measurement places. The distance from each subject to each index is 3.00 m.

TABLE 4

| Subject | Type | Right Eye | | | | | Left Eye | | | |
|---|---|---|---|---|---|---|---|---|---|---|
| | | IndexA | IndexB | IndexC | IndexD | IndexE | IndexA | IndexB | IndexC | IndexD |
| Subject A | LensA | 6 | 7 | 7 | 7 | 7 | 5 | 7 | 7 | 5 |
| | LensB | 6 | 7 | 7 | 7 | 7 | 6 | 7 | 7 | 6 |
| | LensA | 6 | 6 | 5 | 4 | 4 | 6 | 6 | 4 | 3 |
| | LensB | 6 | 7 | 4 | 5 | 5 | 6 | 7 | 5 | 4 |
| Subject B | LensA | 8 | 7 | 8 | 7 | 4 | 5 | 7 | 6 | 5 |
| | LensB | 6 | 7 | 7 | 4 | 5 | 5 | 6 | 6 | 6 |
| | LensA | 8 | 8 | 5 | 3 | 2 | 5 | 5 | 4 | 3 |
| | LensB | 7 | 7 | 7 | 4 | 2 | 5 | 7 | 6 | 4 |
| Subject F | LensA | 5 | 6 | 7 | 6 | 4 | 5 | 5 | 4 | 6 |
| | LensB | 5 | 6 | 5 | 6 | 4 | 5 | 6 | 6 | 6 |
| | LensA | 5 | 5 | 4 | 3 | 1 | 5 | 5 | 4 | 3 |
| | LensB | 5 | 5 | 4 | 3 | 1 | 5 | 5 | 4 | 3 |
| Subject D | LensA | 5 | 7 | 6 | 2 | 1 | 5 | 6 | 5 | 4 |
| | LensB | 5 | 6 | 5 | 2 | 1 | 6 | 7 | 5 | 4 |
| | LensA | 5 | 5 | 4 | 3 | 1 | 6 | 6 | 4 | 3 |
| | LensB | 7 | 6 | 4 | 2 | 1 | 7 | 6 | 5 | 3 |
| | LensA | 6 | 5 | 4 | 2 | 1 | 6 | 5 | 3 | 2 |
| | LensB | 6 | 6 | 3 | 1 | 1 | 6 | 5 | 3 | 2 |
| Subject E | LensA | 6 | 6 | 4 | 5 | 3 | 6 | 6 | 6 | 4 |
| | LensB | 6 | 6 | 4 | 3 | 3 | 5 | 6 | 6 | 5 |
| | LensA | 5 | 6 | 4 | 2 | 1 | 5 | 6 | 5 | 3 |
| | LensB | 6 | 5 | 4 | 3 | 1 | 5 | 6 | 5 | 3 |
| | LensA | 5 | 4 | 3 | 0 | 0 | 5 | 4 | 3 | 0 |
| | LensB | 6 | 6 | 4 | 1 | 1 | 5 | 6 | 4 | 3 |
| Subject C | LensA | 6 | 6 | 5 | 3 | 0 | 6 | 6 | 4 | 4 |
| | LensB | 5 | 6 | 6 | 3 | 0 | 5 | 6 | 4 | 3 |
| | LensA | 5 | 6 | 3 | 0 | 0 | 5 | 5 | 4 | 1 |
| | LensB | 6 | 5 | 3 | 0 | 0 | 5 | 5 | 4 | 2 |

TABLE 4-continued

| Subject | | | | | | | | | | |
|---|---|---|---|---|---|---|---|---|---|---|
| Subject G | LensA | 6 | 7 | 6 | 6 | 4 | 6 | 6 | 6 | 5 |
| | LensB | 6 | 7 | 7 | 6 | 4 | 6 | 7 | 6 | 5 |
| | LensA | 6 | 6 | 5 | 3 | 1 | 5 | 6 | 4 | 3 |
| | LensB | 6 | 6 | 4 | 3 | 1 | 5 | 6 | 4 | 3 |

| | | Left Eye | Both Eyes | | | | | | |
|---|---|---|---|---|---|---|---|---|---|
| Subject | Type | IndexE | Index A | IndexB | IndexC | IndexD | IndexE | Illuminance | Distance |
| Subject A | LensA | 6 | 6 | 7 | 7 | 7 | 7 | 482 lx | 3.00 m |
| | LensB | 6 | 6 | 7 | 7 | 7 | 7 | | |
| | LensA | 4 | 6 | 6 | 5 | 4 | 3 | 31 lx | |
| | LensB | 5 | 6 | 7 | 7 | 6 | 5 | | |
| Subject B | LensA | 6 | 8 | 7 | 6 | 6 | 5 | 482 lx | |
| | LensB | 5 | 6 | 7 | 7 | 6 | 6 | | |
| | LensA | 1 | 7 | 7 | 4 | 3 | 1 | 31 lx | |
| | LensB | 4 | 8 | 7 | 4 | 4 | 2 | | |
| Subject F | LensA | 5 | 5 | 6 | 6 | 6 | 5 | 482 lx | |
| | LensB | 5 | 5 | 6 | 6 | 6 | 5 | | |
| | LensA | 1 | 6 | 6 | 4 | 3 | 1 | 31 lx | |
| | LensB | 1 | 5 | 6 | 4 | 3 | 1 | | |
| Subject D | LensA | 3 | 6 | 7 | 6 | 5 | 4 | 443 lx | |
| | LensB | 4 | 6 | 7 | 6 | 4 | 3 | | |
| | LensA | 1 | 7 | 6 | 5 | 3 | 1 | 31 lx | |
| | LensB | 1 | 7 | 6 | 5 | 3 | 3 | | |
| | LensA | 1 | 6 | 6 | 4 | 2 | 1 | 9 lx | |
| | LensB | 0 | 6 | 6 | 4 | 2 | 1 | | |
| Subject E | LensA | 4 | 6 | 6 | 6 | 6 | 4 | 443 lx | |
| | LensB | 4 | 6 | 7 | 6 | 6 | 5 | | |
| | LensA | 1 | 5 | 6 | 5 | 3 | 3 | 31 lx | |
| | LensB | 1 | 6 | 6 | 5 | 3 | 3 | | |
| | LensA | 0 | 5 | 4 | 4 | 1 | 0 | 9 lx | |
| | LensB | 1 | 5 | 6 | 4 | 3 | 1 | | |
| Subject C | LensA | 3 | 6 | 6 | 6 | 5 | 3 | 435 lx | |
| | LensB | 3 | 6 | 6 | 5 | 4 | 4 | | |
| | LensA | 0 | 5 | 6 | 4 | 2 | 0 | 11 lx | |
| | LensB | 0 | 5 | 6 | 4 | 2 | 0 | | |
| Subject G | LensA | 3 | 6 | 7 | 7 | 6 | 5 | 435 lx | |
| | LensB | 3 | 6 | 7 | 7 | 7 | 5 | | |
| | LensA | 1 | 6 | 6 | 4 | 3 | 1 | 11 lx | |
| | LensB | 1 | 6 | 6 | 5 | 3 | 1 | | |

Contrast sensitivities are converted according to a predetermined conversion table such that, for example, measurement result "6" on index B is converted into contrast sensitivity "85," and measurement result "7" is converted into contrast sensitivity "170." The ratios of the contrast sensitivities obtained with the lenses 1 to the contrast sensitivities obtained with the ordinary single-focus lenses concerning the right eye, the left eye, and both eyes of each subject in each of the bright and dark places, i.e., (contrast sensitivities with lenses 1)/(contrast sensitivities with ordinary single-focus lenses), are obtained for each of indices A to E, based on the contrast sensitivities obtained from the measurement results in Table 4. Table 5 shows the averages of the obtained ratios throughout the respective indices.

TABLE 5

| Subject | Illuminance | Right Eye | Left Eye | Both Eyes |
|---|---|---|---|---|
| Subject A | Bright Place | 100% | 132% | 100% |
| 54 Years Old | Dark Place | 142% | 168% | 220% |
| Subject B | Bright Place | 82% | 95% | 109% |
| 53 Years Old | Dark Place | 145% | 270% | 146% |
| Subject C | Bright Place | 106% | 79% | 93% |
| 50 Years Old | Dark Place | 110% | 112% | 100% |
| Subject D | Bright Place | 81% | 150% | 85% |
| 42 Years Old | Dark Place | 158% | 125% | 130% |
| Subject E | Bright Place | 85% | 104% | 135% |
| 39 Years Old | Dark Place 31lx | 128% | 130% | 120% |
| | Dark Place 9lx | 194% | 214% | 191% |
| Subject F | Bright Place | 88% | 154% | 100% |
| 34 Years Old | Dark Place | 100% | 100% | 90% |

TABLE 5-continued

| Subject | Illuminance | Right Eye | Left Eye | Both Eyes |
|---|---|---|---|---|
| Subject G | Bright Place | 110% | 120% | 108% |
| 26 Years Old | Dark Place | 93% | 100% | 111% |

Table 5 indicates that when, for example, subject A sees with both eyes in a bright place, the contrast sensitivity obtained with the lenses 1 is 100% with respect to the contrast sensitivity obtained with the ordinary single-focus lenses. That is, the contrast sensitivity remains the same with the use of either the lenses 1 or the ordinary single-focus lenses. In contrast, when subject A sees with both eyes in a dark place, the contrast sensitivity obtained with the lenses 1 is 220% with respect to the contrast sensitivity obtained with the ordinary single-focus lenses. That is, the contrast sensitivity obtained with the use of the lenses 1 is increased more than twice that obtained with the use of the ordinary single-focus lenses. As described above, in the dark place (illuminance: 50 lx or less), increases in contrast sensitivity were observed in 12 eyes out of 16 eyes. That is, it is understood that the lens 1 improves the contrast sensitivity in a dark place where a decrease in contrast is observed, for example, in the evening or at night, and exhibits a high contrast sensitivity improving effect in a dark place especially for middle-aged and elderly persons whose contrast sensitivities rapidly deteriorate.

Moreover, selecting constant A from a range of $1.73\times10^{-6}$ to $1.96\times10^{-5}$ makes it possible to obtain an appropriate focal depth extension effect and suppress the occurrence of astigmatism. That is, this increases the focal depth while suppressing peripheral distortion, and hence assists the accommodation of the eyes, thereby allowing the eyes to experience a comfortable feeling and hardly experience fatigue.

Second Embodiment

The second embodiment will be described next. The same reference numerals denote constituent elements common to those of the first embodiment, and a description of them will be omitted as appropriate.

A lens according to the second embodiment is also an eyeglass lens. Like the lens 1, a front surface 3 is a convex surface defined by equation (ii) given above, but a rear surface 2 is obtained by adding an edge thickness reduction component $Dr^{10}$ (where D is a negative constant) for reducing the edge thickness of the lens to the z-coordinate value of the rear surface 2. That is, the rear surface 2 of the lens according to the second embodiment is a concave surface defined by equation (iv) given below.

$$z=r^2/(R_1+(R_1^2-Kr^2)^{1/2})+Ar^3+Dr^{10} \quad \text{(iv)}$$

The edge thickness reduction component $Dr^{10}$ is added to the lens according to the second embodiment in order to reduce the inconvenience of a thick edge thickness of the lens caused by the addition of the focal depth extension component $Ar^3$ (where A is a positive constant) in terms of appearance and weight. In addition, the exponent of r in an edge thickness reduction component is set to as large as 10 to increase the influence on the edge portion of the lens so as to reduce the edge thickness. Note that because r is small in a central portion of the rear surface 2 which is used to see an object, the edge thickness reduction component $Dr^{10}$ is small, and no negative influence is exerted on the focal depth extension effect.

As described in the first embodiment, constant A is preferably selected from a range of $1.73\times10^{-6}$ to $1.96\times10^{-5}$. When constant A is selected from this range, constant D is preferably selected from a range of $-1.88\times10^{-16}$ to $-1.65\times10^{-17}$, and is also preferably selected such that the absolute value of constant D increases with an increase in constant A. This is because selecting constant D in this manner will make the edge thickness of the lens equal to that of an ordinary single-focus lens.

Note that the range of constant D was calculated according to $D=\Delta/a^{10}$ (where a=37.5 mm and the unit of $\Delta$: mm) by calculating, as an increase $\Delta$, an increase in edge thickness of the lens 1 according to the first embodiment relative to the ordinary single-focus lens (an increase in edge thickness when the lens 1 is a 75 mm diameter lens which is often used as an eyeglass lens) when constant A falls within the above range.

Table 6 shows the edge thicknesses of the lenses 1 according to the first embodiment, the lenses according to the second embodiment, and ordinary single-focus lenses (each having a lens diameter of 75 mm) calculated while the S power is changed when $A=1.73\times10^{-6}$ and $D=-1.65\times10^{-17}$, and Table 7 shows those when $A=1.96\times10^{-5}$ and $D=-1.88\times10^{-16}$.

TABLE 6

| S Power (D) | First Embodiment (mm) | Second Embodiment (mm) | Ordinary Single-Focus Lens (mm) |
| --- | --- | --- | --- |
| −2.00 | 3.711 | 3.620 | 3.620 |
| −3.00 | 5.037 | 4.946 | 4.946 |
| −4.00 | 6.156 | 6.065 | 6.065 |
| −5.00 | 7.516 | 7.425 | 7.425 |
| −6.00 | 8.952 | 8.861 | 8.861 |
| −7.00 | 10.139 | 10.048 | 10.048 |
| −8.00 | 11.682 | 11.591 | 11.591 |
| −9.00 | 12.810 | 12.719 | 12.719 |
| −10.00 | 14.477 | 14.386 | 14.386 |

TABLE 7

| S Power (D) | First Embodiment (mm) | Second Embodiment (mm) | Ordinary Single-Focus Lens (mm) |
| --- | --- | --- | --- |
| −2.00 | 4.652 | 3.620 | 3.620 |
| −3.00 | 5.978 | 4.946 | 4.946 |
| −4.00 | 7.097 | 6.065 | 6.065 |
| −5.00 | 8.456 | 7.425 | 7.425 |
| −6.00 | 9.892 | 8.861 | 8.861 |
| −7.00 | 11.079 | 10.048 | 10.048 |
| −8.00 | 12.623 | 11.591 | 11.591 |
| −9.00 | 13.750 | 12.719 | 12.719 |
| −10.00 | 15.417 | 14.386 | 14.386 |

As is understood from Tables 6 and 7, adding the edge thickness reduction component $Dr^{10}$ makes the edge thickness of the lens according to the second embodiment equal to that of the ordinary single-focus lens.

Like the lens 1, the lens according to the second embodiment improves the contrast sensitivity in a dark place, especially the contrast sensitivity of middle-aged and elderly persons in a dark place, and can make the edge thickness of the lens equal to that of an ordinary lens.

Third Embodiment

The first and second embodiments are each a single-focus lens (distance lens) for a myopic person. The third embodiment is a single-focus lens (near lens) for a hyperopic person. The third embodiment will be described below. The same reference numerals denote constituent elements common to those of the first embodiment, and a description of them will be omitted as appropriate.

The lens according to the third embodiment also has a rear surface 2 defined by equation (i) given above and a front surface 3 defined by equation (ii) given above, and a focal depth extension component $Ar^3$ is added to the concave surface (rear surface 2) of the lens, with constant A being a negative number and selected from a range of $-1.96\times10^{-5}$ to $-1.73\times10^{-6}$. This is because when constant A for an eyeglass lens having a normal size falls within this range, an appropriate focal depth extension effect can be obtained, and the occurrence of astigmatism can be suppressed. In addition, $R_1>R_2$.

Figure 9:
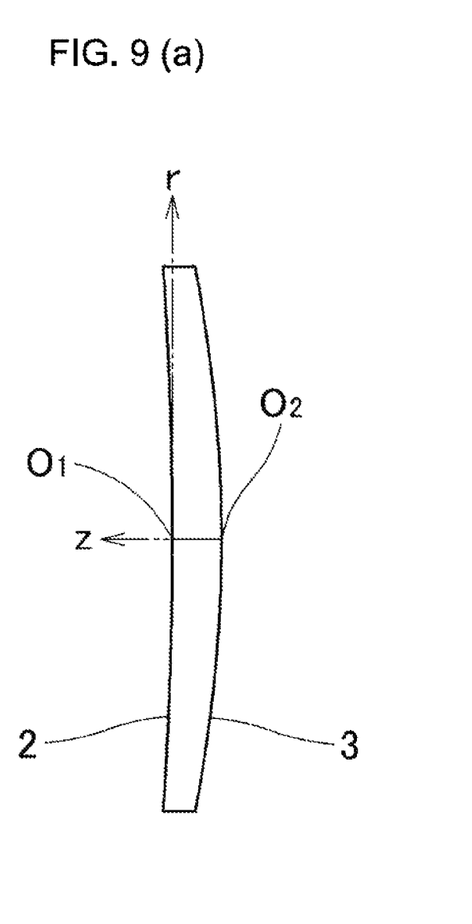
FIG. 9(a) and FIG. 9(b) show a schematic view FIG. 9(a) of an overall lens according to the third embodiment and an enlarged schematic view FIG. 9(b) of an upper half of the same lens.

FIG. 9(a) shows a schematic view of the overall lens according to the third embodiment and FIG. 9(b) shows an enlarged schematic view of an upper half of the lens. As indicated by FIG. 9(b), the lens according to the third embodiment is configured such that the thickness of an original spherical surface S indicated by the two-dot chain line is reduced, and the amount of reduction in the thickness increases toward the edge of the lens.

Table 8 shows an example of lenses according to the third embodiment which respectively have S powers of +1.00D, +2.00D, and +3.00D. Constant A was set to −7.68×10⁻⁶.

TABLE 8

| S | +1.00 D | +2.00 D | +3.00 D |
|---|---|---|---|
| C | −1.00 D | −0.00 D | −0.00 D |
| AX | 0 | 0 | 0 |
| CT (Center Thickness) | 2.80 mm | 3.80 mm | 4.50 mm |
| Δ (Prism) | 0.00 | 0.00 | 0.00 |
| Lens Diameter | 75.00 mm | 75.00 mm | 70.00 mm |
| Convex Surface R ($R_2$) | 108.57 mm | 108.57 mm | 99.18 mm |
| Concave Surface R ($R_1$) | 130.606 mm | 165.434 mm | 187.812 mm |

As in the third embodiment, setting constant A to a negative number will extend the focal depth to a position in front of a focal point before focal depth extension. Because the edge thickness of the lens becomes smaller than that before focal depth extension, there is no need to add an edge thickness reduction component.

The lens according to the third embodiment is configured such that the height from the original spherical surface S decreases in proportion to a third-order power function of a distance r from a base point $O_1$. Accordingly, the focal point is shifted forward toward the edge of the lens. This increases the extension depth and improves the contrast sensitivity in a dark place. In addition, there is no need to add any edge thickness reduction component.

Fourth Embodiment

The fourth embodiment is a single-focus lens (near lens) for a hyperopic person, and differs from the third embodiment in that constant A is a positive number. The fourth embodiment will be described below. The same reference numerals denote constituent elements common to those of the first embodiment, and a description of them will be omitted as appropriate.

The lens according to the fourth embodiment also has a rear surface 2 defined by equation (i) given above and a front surface 3 defined by equation (ii) given above, and a focal depth extension component $Ar^3$ is added to the concave surface (rear surface 2) of the lens, with constant A being a positive number and selected from a range of 1.73×10⁻⁶ to 1.69×10⁻⁵. This is because when constant A for an eyeglass lens having a normal size falls within this range, an appropriate focal depth extension effect can be obtained, and the occurrence of astigmatism can be suppressed. In addition, $R_1 > R_2$. When constant A is set to a positive number, the focal depth is increased to the rear side of a focal point before focal depth extension.

Table 9 shows an example of lenses according to the third embodiment which respectively have S powers of +1.00D, +2.00D, and +3.00D. Constant A was set to 7.68×10⁻⁶.

TABLE 9

| S | +1.00 D | +2.00 D | +3.00 D |
|---|---|---|---|
| C | −0.00 D | −0.00 D | −0.00 D |
| AX | 0 | 0 | 0 |
| CT (Center Thickness) | 2.30 mm | 3.00 mm | 3.80 mm |
| Δ (Prism) | 0.00 | 0.00 | 0.00 |
| Lens Diameter | 75.00 mm | 75.00 mm | 70.00 mm |
| Convex Surface R ($R_2$) | 108.57 mm | 108.57 mm | 99.18 mm |
| Concave Surface R ($R_1$) | 130.885 mm | 166.157 mm | 188.797 mm |

Note that setting constant A to a positive number will extend the focal depth to the rear side of a focal point before focal depth extension. In addition, because the edge thickness increases, an edge thickness reduction component $Dr^{10}$ may be added to the lens. When constant A is selected from a range of 1.73×10⁻⁶ to 1.96×10⁻⁵, constant D is preferably selected from a range of −1.88×10⁻¹⁶ to −1.65×10⁻¹⁷, and is also preferably selected such that the absolute value of constant D increases with an increase in constant A.

The lens according to the fourth embodiment is configured such that the height from an original spherical surface S increases in proportion to a third-order power function of a distance r from a base point $O_1$. Accordingly, the focal point is shifted backward with a reduction in distance to the edge of the lens. This increases the extension depth and improves contrast in a dark place.

<Modification> A modification will be described below.

(1) Constant A for a distance lens like the lens according to the first embodiment may be set to a negative number. When constant A is set to a negative number, the focal depth is increased to the front side of the focal point without the addition of a focal depth extension component. In addition, the edge thickness is smaller than that without the addition of a focal depth extension component.

(2) An equation representing the refractive surface of the lens before the addition of a focal depth extension component $Ar^3$ is not limited to equation (ii) given above. For example, an equation obtained by adding a polynomial represented by $\Sigma A_i r^i$ to equation (ii) given above may be used (that is, the refractive surface before the addition of the focal depth extension component $Ar^3$ is not limited to a spherical surface). In this case, the focal depth extension component $Ar^3$ is further added to the obtained equation. Of course, an equation representing the other surface (the front surface 3 in each embodiment described above) without the addition of a focal depth extension component is also not limited to equation (iii) given above.

(3) Although the focal depth extension component is added to the rear surface 2 (concave surface) in each embodiment described above, the focal depth extension component may be added to the front surface 3 (convex surface) of the lens.

Figure 10:
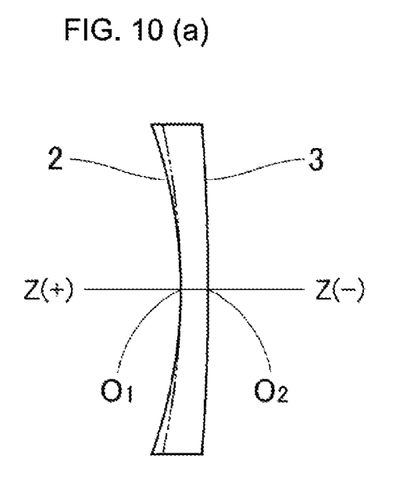
FIG. 10(a), FIG. 10(b), FIG. 10(c) and FIG. 10(d) show a schematic view FIG. 10(a) of a state in which a focal depth extension component is added to the rear surface of a lens, with constant A being positive, a schematic view FIG. 10(b) of a state in which a focal depth extension component is added to the front surface of a lens, with constant A being negative, a schematic view FIG. 10(c) of a state in which a focal depth extension component is added to the rear surface of a lens, with constant A being negative, and a schematic view FIG. 10(d) of a state in which a focal depth extension component is added to the front surface of a lens, with constant A being positive.

That is, the focal depth extension component may be added to the rear surface 2 in one case, or may be added to the front surface 3 in another case. In either case, constant A is set to a positive number or a negative number. FIG. 10(a), FIG. 10(b), FIG. 10(c) and FIG. 10(d) show these four cases. In FIG. 10 (a) shows a state in which constant A is set to a positive number, and the focal depth extension component is added to the rear surface 2 as in the first and fourth embodiments, FIG. 10(b) shows a state in which constant A is set to a negative number, and the focal depth extension component is added to the front surface 3, FIG. 10(c) shows a state in which constant A is set to a negative number, and the focal depth extension component is added to the rear surface 2 as in the third embodiment, and FIG. 10(d) shows a state in which constant A is set to a positive number, and the focal depth extension component is added to the front surface 3. Referring to FIG. 10(a), FIG. 10(b), FIG. 10(c) and FIG. 10(d), each two-dot chain line indicates a surface before the addition of the focal depth extension component. The absolute value of constant A preferably falls within a range of 1.73×10⁻⁶ to 1.96×10⁻⁵. This is because it is obvious in terms of calculation that when constant A falls within this range, an appropriate focal depth extension can be obtained, and the occurrence of astigmatism can be suppressed.

Moreover, in each of the cases shown in FIG. 10(a) and FIG. 10(b), an edge thickness reduction component may be added to the lens because the edge thickness increases. In each of the cases shown in FIG. 10(c) and FIG. 10(d), no edge thickness reduction component needs to be added because the edge thickness decreases. Assume that an edge thickness reduction component is added. In this case, when constant A is a positive number as indicated by FIG. 10(*a*), constant D is set to a negative number, whereas when constant A is a negative number as indicated by FIG. 10(*b*), constant D is set to a positive number. In addition, when the absolute value of constant A falls within the range of $1.73 \times 10^{-6}$ to $1.96 \times 10^{-5}$, the absolute value of constant D is preferably set within a range of $1.65 \times 10^{-17}$ to $1.88 \times 10^{-16}$, and the absolute value of constant D is preferably set so as to increase with an increase in the absolute value of constant A. This is because it is obvious in terms of calculation that determining constant A and constant D for an eyeglass lens having a normal size in this manner can provide an appropriate focal depth extension effect and suppress the occurrence of astigmatism, and in addition, the edge thickness can be set to be equal to that of the lens before the addition of a focal depth extension component.

(4) The exponent of r in an edge thickness reduction component need not be 10. For example, the exponent may be 8, and $Dr^8$ may be added as an edge thickness reduction component.

(5) Although each embodiment described above is a single-focus lens, a focal depth extension component may be added to a progressive lens or a multifocal lens such as a bifocal lens. This is because a focal depth extension effect can be obtained from such a lens like a single-focus lens. In this case, a focal depth extension component may be added to a progressive refractive power surface or multifocal surface or its opposite surface such that a focal depth extension component is added to a convex surface when a concave surface is a progressive refractive power surface or multifocal surface or a focal depth extension component is added to a concave surface when a convex surface is a progressive refractive power surface or multifocal surface.

(6) Assume that a focal depth extension component is added to a progressive lens or bifocal lens. In this case, a focal depth extension component may be added to an overall structure including a distance portion (distance refractive surface) and a near portion (near refractive surface) (an overall structure including a distance portion, a near portion, and a progressive portion in the case of a progressive lens). Alternatively, focal depth extension components may be separately added to a distance portion and a near portion, or a focal depth extension component may be added to only a distance portion or near portion. When focal depth extension components are separately added to a distance portion and a near portion, constant A can differ between the distance portion and the near portion. The same applies to a lens having more than two focal points.

(7) Assume that a progressive lens or multifocal lens is designed so as to increase the S power of a prescription power for a distance portion by 0.25D (that is, decrease the power of the distance portion by 0.25D), and a focal depth extension component is added to the distance portion so as to compensate for a reduction in visibility due to a reduction in power. In this case, because the addition is reduced by 0.25D, the occurrence of distortion is suppressed accordingly.

(8) The present invention may also be applied to contact lenses.

REFERENCE SIGNS LIST

1: lens
2: rear surface
3: front surface

The invention claimed is:

1. A design method for a corrective lens characterized in that when an axis in an anteroposterior direction passing through a geometric center of a lens is defined as a z-axis and a direction extending to a rear side of the lens is defined as a positive direction of the z-axis, a focal depth extension component represented by $Ar^3$, where r is a distance from the z-axis and A is a constant, is added to a z-coordinate value of a refractive surface determined based on a prescription power to increase a focal depth, wherein a profile of the focal depth extension component represented by $Ar^3$, added to the z-coordinate value of the refractive surface, is rotationally symmetric around the z-axis.

2. The design method for a corrective lens according to claim 1, characterized in that the constant A is set such that an absolute value of the constant A falls within a range of $1.73 \times 10^{-6}$ to $1.96 \times 10^{-5}$.

3. A corrective lens characterized in that when an axis in an anteroposterior direction passing through a geometric center of a lens is defined as a z-axis and a direction extending to a rear side of the lens is defined as a positive direction of the z-axis, a focal depth extension component represented by $Ar^3$, where r is a distance from the z-axis and A is a constant, is added to a z-coordinate value of a refractive surface determined based on a prescription power to increase a focal depth, wherein a profile of the focal depth extension component represented by $Ar^3$, added to the z-coordinate value of the refractive surface, is rotationally symmetric around the z-axis.

4. The corrective lens according to claim 3, characterized in that an absolute value of the constant A falls within a range of $1.73 \times 10^{-6}$ to $1.96 \times 10^{-5}$.

5. The design method for a corrective lens according to claim 1, wherein the focal depth extension component is added to a front surface of the lens and the constant A is a positive number or the focal depth extension component is added to a rear surface of the lens and the constant A is a negative number.

6. The design method for a corrective lens according to claim 1, wherein the corrective lens is a bifocal lens or a progressive lens which includes a distance refractive portion and a near refractive portion, wherein the focal depth extension component is added to one of the distance refractive portion and the near refractive portion, alternatively the focal depth extension components of which values of the constant A differ from each other are separately added to the distance refractive portion and the near refractive portion.

7. The corrective lens according to claim 3, wherein the focal depth extension component is added to a front surface of the lens and the constant A is a positive number or the focal depth extension component is added to a rear surface of the lens and the constant A is a negative number.

8. The corrective lens according to claim 3, wherein the corrective lens is a bifocal lens or a progressive lens which includes a distance refractive portion and a near refractive portion, wherein the focal depth extension component is added to one of the distance refractive portion and the near refractive portion, alternatively the focal depth extension components of which values of the constant A differ from each other are separately added to the distance refractive portion and the near refractive portion.

\* \* \* \* \*